ABSTRACT OF THE DISCLOSURE

N-(p-substituted aminophenyl) cyclic alkyleneimines are disclosed which have the formula

in which $n$ is 4 to 6 and $R_1$ and $R_2$ are each from the class consisting of straight and branched chain and hydroxy alkyl groups of 1 to 10 carbon atoms and aryl groups of the class consisting of phenyl and naphthyl and alkyl and alkoxy derivatives thereof in which the alkyl group is a lower straight or branched chain alkyl group of 1 to 4 carbon atoms, except that $R_1CHR_2$ may be a cycloalkyl group containing 5 to 8 carbon atoms.

---

This invention relates to new compounds suitable for use as antiozonants and antioxidants in natural and synthetic rubbers, and their preparation. (They are referred to herein as antiozonants.) The piperidine derivatives are more effective in rubbers than the other compounds disclosed herein, and the invention includes the curing of rubbers in their presence, and the resulting rubbers.

The antiozonants have the following formula:

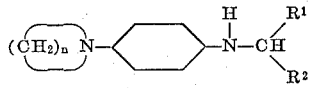

where $n$ is 4 to 6 and $R_1$ and $R_2$ are each from the class consisting of straight and branched chain and hydroxy alkyl groups of 1 to 10 carbon atoms and aryl groups of the class consisting of phenyl and naphthyl, and alkyl and alkoxy derivatives thereof in which the alkyl group is a lower straight or branched chain alkyl group of 1 to 4 carbon atoms; except that $R_1CHR_2$ may be a cycloalkyl group containing 5 to 8 carbon atoms. The preferred compounds for the protection of rubber vulcanizates are the piperidine derivatives in which $n$ is 5. They are preferred because of their greater effectiveness and less toxicity.

Representative compounds of the above formula are:

N-(p-isopropylaminophenyl) piperidine
N-[p-2(4-methylpentyl)aminophenyl] piperidine
N-(p-cyclohexylaminophenyl) piperidine
N-(p-2-octylaminophenyl) piperidine
N-[p-(α-phenylethyl)aminophenyl] piperidine
N-[p-(diphenylmethyl)aminophenyl] piperidine
N-(p-cyclopentylaminophenyl) piperidine
N-[p-2(4-hydroxy-4-methylpentylaminophenyl] piperidine
N-(p-cycloheptylaminophenyl) piperidine
N(p-isopropylaminophenyl) hexamethyleneimine
N(p-2-octylaminophenyl) hexamethyleneimine
N[p-2(4-methylpentyl)aminophenyl] hexamethyleneimine
N[p-2(4-hydroxy-4-methylpentyl)aminophenyl] hexamethyleneimine
N(p-cyclohexylaminophenyl) hexamethyleneimine The compounds are advantageously prepared by reductive alkylation of the nitro-derivative of the appropriate ring compound with a ketone and hydrogen usually with a catalyst, e.g. platinum oxide. Usually room temperature will be used, but temperatures above and below may be employed.

The rubbers which are protected by these antiozonants are natural rubber and diene synthetic rubbers, i.e., homopolymers and copolymers of hydrocarbon dienes of 4 and 5 carbon atoms (viz butadiene, isoprene and piperylene) and copolymers of such dienes with monomers such as styrene, alkyl-substituted styrenes, vinyl toluene, acrylonitrile, lower-alkyl acrylate and methacrylate esters.

The vulcanizates are prepared by adding to the rubber any usual amount of antiozonant together with rubber and other compounding ingredients and curing at any usual temperature.

The following examples are illustrative of the preparation of the antiozonants. The preparation of the nitro-intermediates is also described.

PREPARATION OF N-(4-NITROPHENYL) PYRROLIDINE

In a 1-liter round-bottom flask fitted with a mechanical stirrer, a reflux condenser, and a thermometer was placed 158 gr. (1 mole) of 1-chloro-4-nitrobenzene and 256 gr. (3.6 moles) of pyrrolidine. The reaction mixture was stirred and heated cautiously by means of a heating mantle. When the temperature reached 60° C. (pot temperature) a vigorous reaction took place and the heating mantle was removed and external cooling was supplied. When the initial reaction subsided, the flask was cooled and the orange-yellow crystals were separated by filtration. The crystalline product was washed with water, then digested with warm methanol, cooled, filtered and air dried to yield 184.3 gr. of product; M.P. 169–171° C.

Example 1.—Preparation of N-(4-isopropylaminophenyl) pyrrolidine

The N-(4-nitrophenyl) pyrrolidine (9.61 gr., 0.05 mole), acetone (4.36 gr., 0.075 mole), glacial acetic acid (1 ml.), platinum oxide (200 mg.) and 100 ml. of absolute ethanol were mixed and hydrogenated on a Paar Hydrogenator Apparatus at an initial hydrogen pressure of 50 p.s.i.g. When the uptake of hydrogen had ceased, the reaction mixture was filtered to remove the catalyst and evaporated to dryness. The product was purified by chromatography on alumina and was a yellow oil.

Analysis.—Calcd. for $C_{13}H_{20}N_2$: C, 76.80; H, 9:42; N, 13.78. Found: C, 76.55; H, 10:00; N, 13.49.

Example 2.—Preparation of N-(p-cyclohexylaminophenyl) pyrrolidine

This product was prepared in the same manner as in Example 1 except that cyclohexanone was used in place of the acetone. This product was a colorless crystalline material melting at 83° C.

Analysis.—Calcd. for $C_{16}H_{24}N_2$: C, 78.64; H, 9.89; N, 11.46. Found: C, 78.88; H, 9.96; N, 11.36.

PREPARATION OF N-(4-NITROPHENYL) PIPERIDINE

In a 1-liter round-bottom flask fitted with a reflux condenser, a mechanical stirrer and a thermometer was placed 158 gr. (1 mole) of 1-chloro-4-nitrobenzene and 275 ml. (2.8 moles) of piperidine. The reaction mixture was heated at reflux for four hours, cooled and diluted with water and filtered. The solid product was washed thoroughly with water and dried at 80° C. The orange crystalline product melted at 102–104° C.

Example 3.—Preparation of N-(p-isopropylaminophenyl) piperidine

The N-(4-nitrophenyl) piperidine (10.3 gr., 0.05 mole), acetone (6.3 gr. 0.11 mole), glacial acetic acid (1 ml.), platinum oxide (0.1 gr.) and absolute ethanol (100 ml.) were mixed and hydrogenated on a Paar Hydrogenator Apparatus at an initial hydrogen pressure of 50 p.s.i.g. When the uptake of hydrogen had ceased, the reaction mixture was filtered to remove the catalyst and evaporated to dryness. The product was purified by chromatography on alumina and was an oil.

*Analysis.*—Calcd. for $C_{14}H_{22}N_2$: C, 77.01; H, 10.16; N, 12.83. Found: C, 76.50; H, 10.44; N, 12.05.

Example 4.—Preparation of N-[p-2-(4-methylpentyl) aminophenyl] piperidine

The reaction was carried out in the same manner as in Example 3 except that mesityl oxide was used in place of the acetone. The product was an oil and was purified by chromatography on alumina.

*Analysis.*—Calcd. for $C_{17}H_{28}N_2$: C, 78.40; H, 10.84; N, 10.76. Found: C, 78.30; H, 10.73; N, 10.18.

Example 5.—Preparation of N-(p-cyclohexylaminophenyl) piperidine

This compound was prepared in the same manner as in Example 3 except that cyclohexanone was used in place of the acetone. The product after purification by chromatography on alumina melted at 40–41.5° C.

*Analysis.*—Calcd. for $C_{17}H_{26}N_2$: C, 79.02; H, 10.14; N, 10.84. Found: C, 78.85; H, 10.15; N, 10.34.

PREPARATION OF N-(p-NITROPHENYL) HEXAMETHYLENEIMINE

In a 1-liter round-bottom flask fitted with a thermometer, a reflux condenser and a mechanical stirrer was placed 158 gr. (1 mole) of 1-chloro-4-nitrobenzene and 247 gr. (2.5 moles) of hexamethyleneimine. The reaction mixture was heated at reflux with stirring for four hours, diluted with water, cooled and filtered. The product was recrystallized from methanol and air dried. The bright yellow crystalline product melted at 76.2–77.0° C.

Example 6.—Preparation of N-(p-isopropylaminophenyl) hexamethyleneimine

The N-(p-nitrophenyl) hexamethyleneimine (11.0 gr., 0.05 mole), acetone (3.2 gr., 0.055 mole), glacial acetic acid (1 ml.), platinum oxide (0.20 gr.) and absolute ethanol (100 ml.) were mixed and hydrogenated on a Paar Hydrogenator Apparatus at an initial hydrogen pressure of 50 p.s.i.g. After the uptake of hydrogen had ceased, the reaction mixture was filtered and evaporated resulting in an oily product which was purified by chromatography on alumina.

*Analysis.*—Calcd. for $C_{15}H_{24}N_2$: C, 77.52; H, 10.41; N, 12.06. Found: C, 77.35; H, 10.56; N, 11.63.

Example 7.—Preparation of N-(p-2-octylaminophenyl) hexamethyleneimine

This product was prepared in the same manner as shown in Example 6 except 2-octanone was used in place of acetone. The product was an oil and was purified by chromatography on alumina.

*Analysis.*—Calcd. for $C_{20}H_{34}N_2$: C, 79.41; H, 11.33; N, 9.26. Found: C, 79.30; H, 11.18; N, 9.03.

Example 8.—Preparation of N-[p-2-(4-methylpentyl) aminophenyl] hexamethyleneimine This product was prepared in the manner shown in Example 6 except mesityl oxide was used in place of acetone. The oily product was purified by chromatography on alumina.

*Analysis.*—Calcd. for $C_{18}H_{30}N_2$: C, 78.77; H, 11.02; N, 10.21. Found: C, 78.85; H, 10.92; N, 10.00.

Example 9.—Preparation of N-[p-2-(4-hydroxy-4-methylpentyl)aminophenyl] hexamethyleneimine This product was prepared as shown in Example 6 except diacetone alcohol was used in place of the acetone. The oily product was purified by chromatography.

*Analysis.*—Calcd. for $C_{18}H_{30}N_2O$: C, 74.45; H, 10.42. Found: C, 74.95; H, 10.13.

Example 10.—Preparation of N-(p-cyclohexylaminophenyl) hexamethyleneimine

This product was prepared in the manner shown in Example 6 except cyclohexanone was used in place of the acetone. The colorless crystalline product was recrystallized from petroleum ether (B.P. 30–60°) and melted at 50–51° C.

*Analysis.*—Calcd. for $C_{18}H_{28}N_2$: C, 79.35; H, 10.36; N, 10.29. Found: C, 79.37; H, 10.20; N, 10.27.

Test samples were prepared in a usual formula for compounding GR-S using 2 parts of each of several different antiozonants, and these were cured at 280° F. for 60 minutes. The following table shows that the vulcanizates had good properties, they stood up well on being subjected to oxidation in an oven 2 days at 212° F. Antiozonant test results are recorded, using this scale: very, very slight — (v. v. sl. —), very, very slight (v. v. sl.), very slight (v. sl.), slight — (sl. —), and slight (sl.), slight + (sl. +), moderate —, moderate and moderate +. The results show that although chemicals of these various classes have antiozonant value, the piperidine derivatives are unexpectedly superior to the compounds of the pyrrolidine and hexamethyleneimine series, and it is the use of these compounds only, in rubber, which is claimed herein. Furthermore, toxicity tests show the piperidine compounds to be less toxic than the corresponding pyrrolidine and hexamethyleneimine compounds, and they are safe for commercial use.

In the table, the compounds are identified as follows, the pyrrolidine and hexamethyleneimine compounds prepared in a similar manner being included to illustrate the small antioxidant effect of these similar compounds:

A = N(p-cyclohexylaminophenyl) pyrrolidine
B = N(p-isopropylaminophenyl) pyrrolidine
C = N(p-isopropylaminophenyl) hexamethyleneimine
D = N(p-cyclohexylaminophenol) hexamethyleneimine
E = N[p-2(4-methylpentyl)aminophenyl] piperidine
F = N(p-isopropylaminophenyl) piperidine
G = N(p-cyclohexylaminophenyl) piperidine The following table gives the test results.

| | ANTIOZONANT | | | | | | | |
|---|---|---|---|---|---|---|---|---|
| | A | B | C | D | E | F | G | Blank |
| Physical properties: | | | | | | | | |
| Before aging: | | | | | | | | |
| 300% modulus, p.s.i. | 1,025 | 900 | 1,225 | 1,250 | 1,425 | 1,275 | 1,300 | 1,600 |
| 400% modulus, p.s.i. | 1,450 | 1,450 | 1,850 | 1,875 | 2,175 | 1,275 | 2,025 | 2,450 |
| Tensile strength, p.s.i. | 3,100 | 3,375 | 3,400 | 3,500 | 3,750 | 3,375 | 3,600 | 3,200 |
| Elongation, percent | 680 | 740 | 640 | 660 | 580 | 620 | 610 | 490 |
| After aging: | | | | | | | | |
| 300% modulus, p.s.i. | 1,750 | 1,830 | 2,025 | 2,100 | 2,425 | 2,575 | 2,400 | |
| Tensile strength, p.s.i. | 3,300 | 3,325 | 3,250 | 3,275 | 2,850 | 3,075 | 2,400 | 2,150 |
| Elongation, percent | 490 | 490 | 440 | 440 | 340 | 340 | 300 | 280 |
| Ozone cracking | sl. | sl.+ | sl.+ | sl. | v.v. sl.— | v.v. sl.— | v.sl.— | Mod. |

What I claim is:
1. Compounds of the formula:

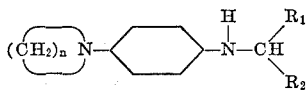

in which $n$ is 4 to 6 and $R_1$ and $R_2$ are each from the class consisting of straight and branched chain and hydroxy alkyl groups of 1 to 10 carbon atoms and aryl groups of the class consisting of phenyl and naphthyl and alkyl and alkoxy derivatives thereof in which the alkyl group is a lower straight or branched chain alkyl group of 1 to 4 carbon atoms, except that $R_1CHR_2$ may be a cycloalkyl group containing 5 to 8 carbon atoms.

2. The compounds of claim 1 in which $n$ is 4.
3. The compounds of claim 1 in which $n$ is 5.
4. The compounds of claim 1 in which $n$ is 6.
5. The compounds of claim 1 in which $R_1$ and $R_2$ are both alkyl.
6. The compounds of claim 1 in which $R_1$ and $R_2$ are both aryl.
7. The compounds of claim 1 in which $R_1$ is alkyl and $R_2$ is aryl.
8. The compounds of claim 1 in which $R_1$ is hydroxyalkyl and $R_2$ is alkyl.
9. N-(p-isopropylaminophenyl) pyrrolidine.
10. N-(p-cyclohexylaminophenyl) pyrrolidine.
11. N-(p-isopropylaminophenyl) piperidine.
12. N-[p-2(4 - hydroxy-4-methylpentyl)aminophenyl] piperidine.
13. N-[p-2-(4-methylpentyl)aminophenyl] piperidine.
14. N-(p-cyclohexylaminophenyl) piperidine.
15. N-[p-2-(4 - hydroxy-4-methylpentyl)aminophenyl] hexamethyleneimine.
16. N-(p-isopropylaminophenyl hexamethyleneimine.
17. N-(p-2-octylaminophenyl) hexamethyleneimine.
18. N-[p-2-(4-methylpentyl)aminophenyl] hexamethyleneimine.
19. N-(p-cyclohexylaminophenyl) hexamethyleneimine.

References Cited

UNITED STATES PATENTS 1,899,058   2/1933   Reed _____ 260—800
2,991,979   6/1960   Pohle et al. _____ 260—800

OTHER REFERENCES

Emerson et al., J. Am. Chem. Soc., vol. 63, pp. 749–51 (1941).

ALEX MAZEL, Primary Examiner
BERNARD I. DENTZ, Assistant Examiner

U.S. Cl. X.R.

260—293, 294.7, 326.5, 326.85, 800

Dedication 3,480,617.—*Kelly Farhat*, Akron, Ohio. N-(p-SUBSTITUTED AMINOPHENYL) CYCLIC ALKYLENEIMINES AND THEIR PREPARATION. Patent dated Nov. 25, 1969. Dedication filed Dec. 21, 1970, by the assignee, *The Firestone Tire & Rubber Company*.

Hereby dedicates to the people of the United States the entire term of said patent.

[*Official Gazette May 11, 1971.*]